United States Patent
Wei et al.

(10) Patent No.: US 10,809,996 B2
(45) Date of Patent: Oct. 20, 2020

(54) METHOD AND DEVICE FOR CREATING IMAGES OF DIFFERENT INSTALLATION AND DOWNLOAD SOFTWARE UNITS

(71) Applicant: Acer Incorporated, New Taipei (TW)

(72) Inventors: Chiu-Ling Wei, New Taipei (TW);
Hung-Ming Chang, New Taipei (TW);
Ming-Hao Kuo, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 16/205,240

(22) Filed: Nov. 30, 2018

(65) Prior Publication Data
US 2019/0171431 A1    Jun. 6, 2019

(30) Foreign Application Priority Data
Dec. 6, 2017   (TW) .............................. 106142768 A

(51) Int. Cl.
*G06F 9/445*  (2018.01)
*G06F 8/61*   (2018.01)
*G06F 16/11*  (2019.01)
*G06F 16/174* (2019.01)

(52) U.S. Cl.
CPC .............. *G06F 8/63* (2013.01); *G06F 16/116* (2019.01); *G06F 16/1744* (2019.01)

(58) Field of Classification Search
CPC . G06F 8/61–63; G06F 16/1744; G06F 16/116
USPC ................................................. 717/168–177
See application file for complete search history.

(56) References Cited

U.S. PATENT DOCUMENTS

| 5,257,377 | A | * | 10/1993 | Sathi | ...................... | G03G 15/50 |
| | | | | | | 713/1 |
| 5,953,533 | A | * | 9/1999 | Fink | .......................... | G06F 8/65 |
| | | | | | | 705/51 |
| 6,281,874 | B1 | * | 8/2001 | Sivan | .................... | G06T 3/4092 |
| | | | | | | 345/660 |
| 6,282,711 | B1 | * | 8/2001 | Halpern | .................... | G06F 8/61 |
| | | | | | | 709/203 |

(Continued)

FOREIGN PATENT DOCUMENTS

TW         200923776       6/2009
TW         201023034       6/2010
(Continued)

OTHER PUBLICATIONS

Porter et al, "Operating System Transactions", ACM, pp. 161-176 (Year: 2009).*

(Continued)

*Primary Examiner* — Anil Khatri
(74) *Attorney, Agent, or Firm* — JCIPRNET

(57) ABSTRACT

A method for creating image and a device thereof are provided. The method includes the following steps. A first software content list of a plurality of electronic devices is loaded. An operating system (OS), a plurality of first drivers and a plurality of first software are downloaded according to the first software content list. The OS, the plurality of first drivers and the plurality of first software are compressed into first image. The first image is decompressed, the first image is executed on each of the plurality of electronic devices, and the OS, at least one of the plurality of first drivers, and at least one of the plurality of first software are installed.

8 Claims, 7 Drawing Sheets

(56) References Cited

U.S. PATENT DOCUMENTS

| | | | |
|---|---|---|---|
| 6,549,914 B1* | 4/2003 | Valys | G06F 16/9577 |
| 7,032,179 B2* | 4/2006 | Mack | G06T 11/60 |
| | | | 715/744 |
| 7,194,738 B2* | 3/2007 | Lin | G06F 8/63 |
| | | | 717/174 |
| 7,356,679 B1* | 4/2008 | Le | G06F 9/45558 |
| | | | 713/1 |
| 7,644,264 B1* | 1/2010 | Olsen | G06F 9/4416 |
| | | | 710/104 |
| 7,707,007 B2* | 4/2010 | Campbell | G06Q 10/10 |
| | | | 702/182 |
| 7,802,084 B2* | 9/2010 | Fitzgerald | G06F 8/63 |
| | | | 709/222 |
| 8,136,100 B1* | 3/2012 | Goldman | G06F 8/61 |
| | | | 717/120 |
| 8,365,164 B1* | 1/2013 | Morgenstern | G06F 9/44552 |
| | | | 717/108 |
| 8,448,162 B2* | 5/2013 | Ramanathan | G06F 8/65 |
| | | | 717/171 |
| 8,555,273 B1* | 10/2013 | Chia | G06F 8/654 |
| | | | 717/173 |
| 8,666,938 B1* | 3/2014 | Pancholy | G06F 9/455 |
| | | | 707/610 |
| 8,739,150 B2* | 5/2014 | Gass | G06F 8/72 |
| | | | 717/168 |
| 8,898,627 B2* | 11/2014 | Gass | G06F 8/65 |
| | | | 717/106 |
| 10,136,735 B2* | 11/2018 | Ocegueda | A47C 21/044 |

FOREIGN PATENT DOCUMENTS

| | | |
|---|---|---|
| TW | 201117095 | 5/2011 |
| TW | 201723847 | 7/2017 |

OTHER PUBLICATIONS

Tanenbaum et al, "Distributed Operating Systems", ACM, pp. 419-470 (Year: 1985).*

Cho et al, "Case Study on Installing a Porting Process for Embedded Operating System in a Small Team", IEEE, pp. 19-25 (Year: 2011).*

Kaguma et al, "Towards Cooperative Content Downloading for Resource-constrained Mobile Devices", ACM, pp. 189-198 (Year: 2016).*

Heiner et al, "Secure Software Installation in a Mobile Environment", ACM, pp. 155-156 (Year: 2007).*

Azab et al, "Software Provisioning Inside a Secure Environment as Docker Containers using STROLL File-system", IEEE, pp. 674-683 (Year: 2016).*

Steiner, "Building and Installing a Beowulf Cluster", ACM, pp. 78-87 (Year: 2001).*

* cited by examiner

METHOD AND DEVICE FOR CREATING IMAGES OF DIFFERENT INSTALLATION AND DOWNLOAD SOFTWARE UNITS

CROSS-REFERENCE TO RELATED APPLICATION

This application claims the priority benefit of Taiwan application serial no. 106142768, filed on Dec. 6, 2017. The entirety of the above-mentioned patent application is hereby incorporated by reference herein and made a part of this specification.

BACKGROUND OF THE INVENTION

Field of the Invention

The invention relates to a method and a device for creating image, and particularly relates to a method and a device for creating a common image of same installation software between a plurality of electronic devices, and creating images of different installation software between the electronic devices.

Description of Related Art

An image is a file form of converting the content of a storage medium into a disk image, which facilitates a user to save or burn and duplicate data in the storage medium. Moreover, the image may be further applied for automatic installation and setting of an operating system, application programs and drivers of an electronic product and update and test of software hardware functions of the electronic product.

Regarding a present method for creating an image of the electronic product, a test computer has to be prepared to serve as a carrier for installing an operating system, application programs and preload settings, and image capturing and segmenting is performed to the test computer after the installation and settings are completed. During such process, based on different product lines or brands, an exclusive image is generally created for each of the product lines and brands. In other words, the images of each of the electronic products of different product lines or brands are different.

However, the images created according to different product lines have high repeatability in content, and a creating procedure thereof is complicated. On the other hand, the image captured after the operating system is pre-installed is liable to have a problem in hardware compatibility in the test, so that it takes a lot of time and manpower to resolve the problem in hardware compatibility.

SUMMARY OF THE INVENTION

An embodiment of the invention is directed to a method and a device for creating image, which are adapted to ameliorate a flow for creating the image to reduce a creating time and storage cost, and effectively resolve the problem in hardware compatibility of the image.

An embodiment of the invention provides a method for creating image, which includes: loading a first software content list of a plurality of electronic devices; downloading an operating system, a plurality of first drivers and a plurality of first software according to the first software content list; compressing the operating system, the plurality of first drivers and the plurality of first software into a first image; decompressing the first image, so as to execute the first image on each of the plurality of electronic devices, and install the operating system, at least one of the plurality of first drivers, and at least one of the plurality of first software.

An embodiment of the invention provides an image creating device including a storage device and a processor. The storage device stores a plurality of modules and a database, the processor is coupled to the storage device, and is configured to load and execute the modules stored in the storage device. The modules include an input module, a download module and an image creating module. The input module is configured for loading a first software content list of a plurality of electronic devices; the download module is configured for downloading an operating system, a plurality of first drivers and a plurality of first software from a server according to the first software content list; and the image creating module is configured for compressing the operating system, the plurality of first drivers and the plurality of first software into a first image. Each of the electronic devices obtains the decompressed first image, and executes the first image to install the operating system, at least one of the plurality of first drivers, and at least one of the plurality of first software.

According to the above description, the method for creating image of the exemplary embodiment of the invention may separately create the operating system and installation software commonly required by the plurality of electronic devices and the installation software individually required by the electronic devices into different images, so as to increase a reuse rate of the image commonly used by the electronic devices, and effectively improve the efficiency for creating the image.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
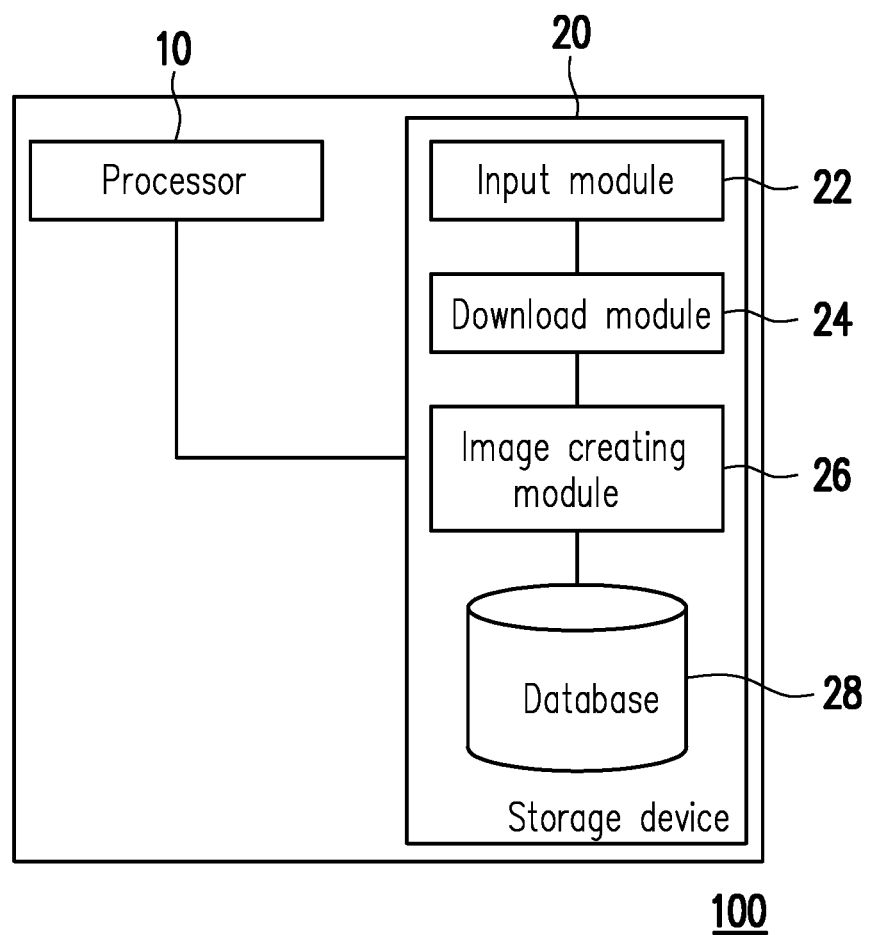
FIG. 1 is a block diagram of an image creating device according to an exemplary embodiment of the invention.

FIG. 1 is a block diagram of an image creating device according to an exemplary embodiment of the invention. It should be noted that the exemplary embodiment of FIG. 1 is only an example, which is not used for limiting the invention.

Referring to FIG. 1, the image creating device 100 includes a storage device 20 and a processor 10. The image creating device 100 may be a local server or a remote server connected to the Internet. For example, the image creating device 100 may be a server platform such as a desktop computer, a notebook, a tablet personal computer (PC), etc.

The storage device 20 may be any type of a fixed or movable random access memory (RAM), a read-only memory (ROM), a flash memory, a solid state drive (SSD) or a similar component or a combination of the above components. In the present exemplary embodiment, the storage device 20 stores an input module 22, a download module 24, an image creating module 26 and a database 28.

The processor 10 is coupled to the storage device 20, and the processor 10 may be a central processing unit (CPU) having a single core or multiple cores, or other programmable general purpose or special purpose microprocessor, a digital signal processor (DSP), a programmable controller, an application specific integrated circuit (ASIC) or other similar devices or a combination of the above devices. In the present embodiment, the processor 10 is configured for accessing and executing the modules recorded in the storage device 20 to implement a method for creating image of the embodiment of the invention.

In the present exemplary embodiment, an original equipment manufacturing (OEM) end determines software such as an operating system, drivers, application programs, etc., installed in an electronic product according to a software content list (SLC) of the electronic product provided by a product manager, creates an image (which is also referred to as a recover CD (RCD)) commonly used by a plurality of electronic products and an image (which is also referred to as a software CD (SCD)) corresponding to differences between the plurality of electronic products through the image creating device 100. After the OEM end creates the images, the OEM end may provide the images to an original design manufacturing (ODM) end or the ODM end downloads the images from the image creating device 100. The electronic products are, for example, various types of electronic devices such as notebooks, desktop computers, mobile device, table PCs, printers, etc. Then, the ODM end may decompress the images to the corresponding electronic products to be sold to carry on an installation and setting procedure, so as to complete manufacturing the electronic products.

Figure 2:
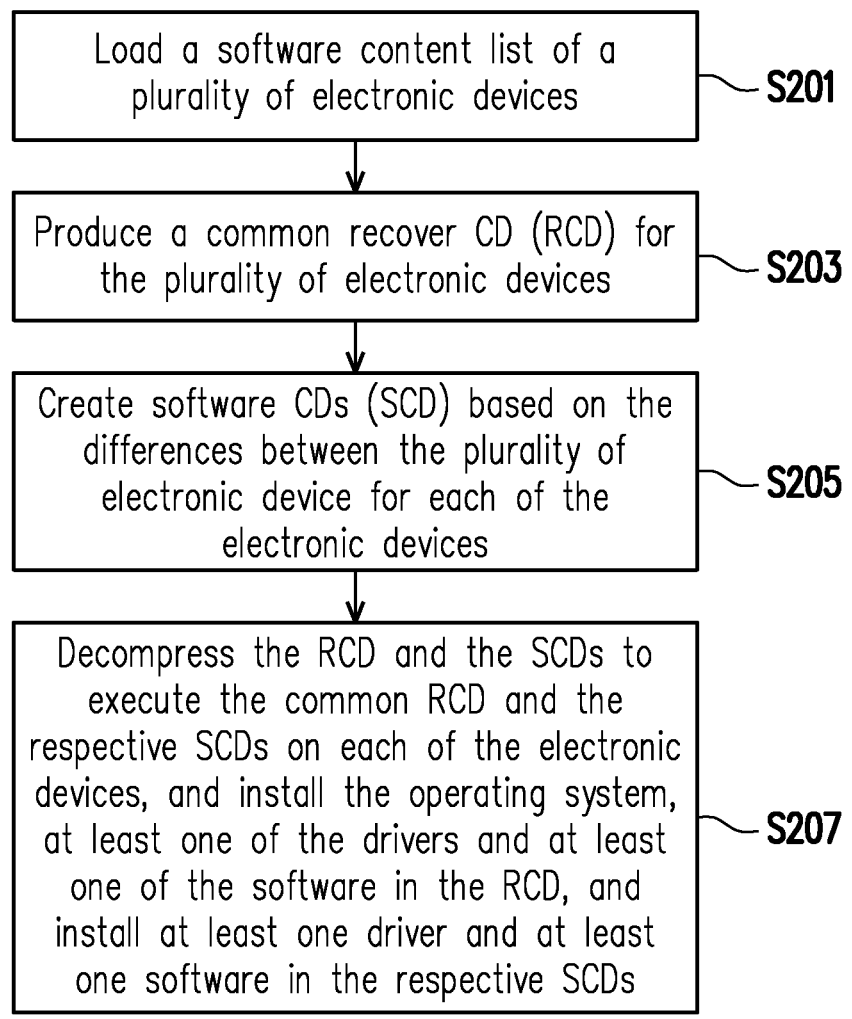
FIG. 2 is a flowchart illustrating a method for creating image according to an exemplary embodiment of the invention.

FIG. 2 is a flowchart illustrating a method for creating image according to an exemplary embodiment of the invention. Referring to FIG. 1 and FIG. 2, the method of the present embodiment is adapted to the aforementioned image creating device 100, and detailed flow of the method of the present embodiment is described below with reference of various components of the image creating device 100 of FIG. 1.

In step S201, the input module 22 of the image creating device 100 loads a software content list (which is also referred to as a first software content list) of a plurality of electronic devices. To be specific, in the exemplary embodiment of the invention, the plurality of electronic devices may belong to different product lines or different brands, and the first software content list records an operating system, a plurality of drivers (which are also referred to as first drivers) and a plurality of software (which are also referred to as first software) commonly installed by the electronic devices of different product lines or different brands.

Figure 3A:
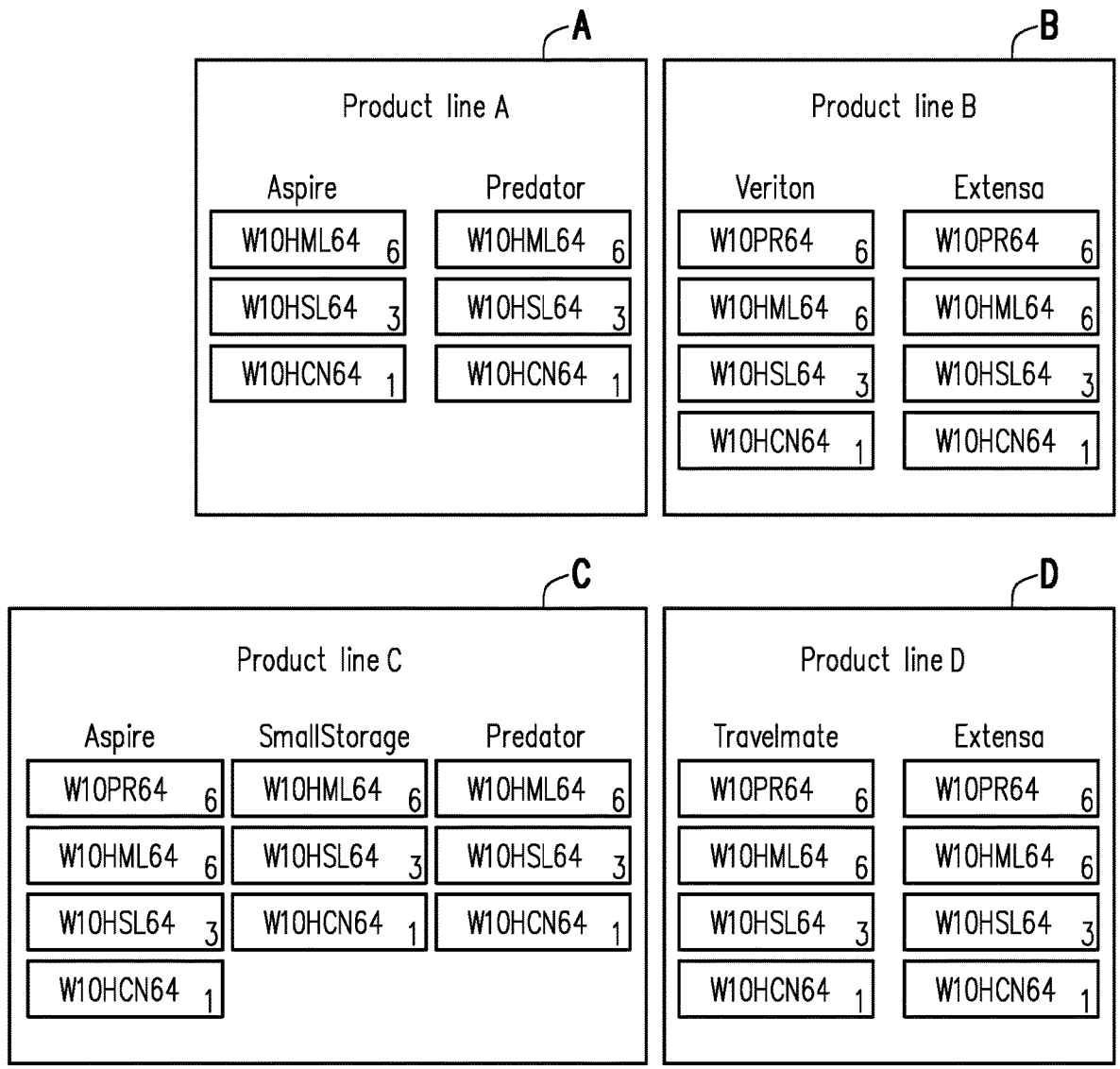
FIG. 3A illustrates the numbers of versions of operating systems required by electronic devices of different models under four different product lines.
Figure 3B:
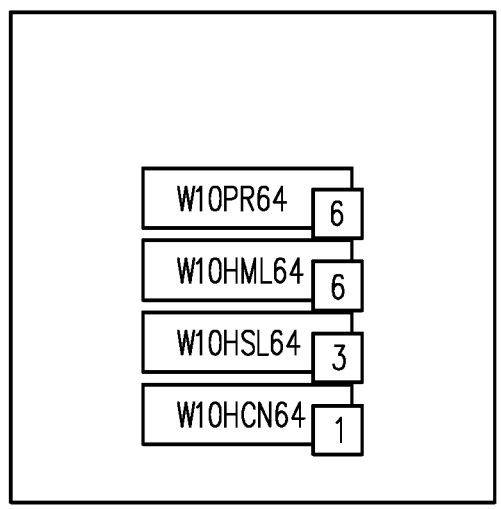
FIG. 3B illustrates the numbers of simplified common versions of the operating systems required by the electronic devices of different models under four different product lines.

Taking the operating system as an example, FIG. 3A illustrates the numbers of versions of the operating systems required by the electronic devices of different models under four different product lines. FIG. 3B illustrates the numbers of simplified common versions of the operating systems required by the electronic devices of different models under four different product lines. Referring to FIG. 3A and FIG. 3B, a model "Aspire" and a model "Predator" under the product line A respectively require an operating system "W10HML64" of a sixth version, an operating system "W10HSL64" of a third version and an operating system "W10HCN64" of a first version. Deduced by analogy, a model "Veriton" and a model "Extensa" under the product line B respectively require an operating system "W10OR64" of a sixth version, the operating system "W10HML64" of the sixth version, the operating system "W10HSL64" of the third version and the operating system "W10HCN64" of the first version. According to FIG. 3A, it is known that the product lines A-D have repeated operating system content and repeated number of required versions. In other words, if a conventional method is adopted to create the image, the respective images are created for each of the product lines A-D, and the same operating system content will be built over dozens of versions. Therefore, the first software content list of the exemplary embodiment of the invention only records the commonly used operating systems of the product lines A-D. As shown in FIG. 3B, the commonly used operating systems of the product lines A-D only include the operating system "W10OR64" of the sixth version, the operating system "W10HML64" of the sixth version, the operating system "W10HSL64" of the third version and the operating system "W10HCN64" of the first version. In this way, the number of images required to be created by the image creating device 100 and the number of the operating systems contained in the images may be effectively reduced. In other words, the complexity of the image is reduced and is easier to control.

Referring to FIG. 2, in step S203, the image creating device 100 may produce a common recover CD (RCD) for the plurality of electronic devices. To be specific, the download module 24 downloads an operating system, the first drivers and the first software from a server according to the first software content list, and the image creating module 26 compresses the operating system, the first drivers and the first software downloaded by the download module 24 into an image (which is also referred to as a first image). The server is, for example, a cloud server, which records the content of the latest versions of the operating system, the drivers and the application programs provided by each vendor.

It should be noted that difference between the method for creating image of the exemplary embodiment of the invention and the conventional method for creating image is that in the present embodiment, after the download module 24 of the image creating device 100 downloads the operating system, the first drivers and the first software indicated by the first software content list, the image creating module 26 may directly compress the downloaded operating system, the first drivers and the first software into the image without actually installing the operating system, the application programs and preload settings on a computer or the image creating device 100 as that does in the conventional method. Moreover, in the process of creating the image where the operating system is pre-installed and then a state of the electronic device is captured, not only a lot of time is spent on the pre-installation procedure, since the operating system is ever aroused on the hardware device for testing, the operating system in the image probably has collected hardware information and behaviours of the hardware device for testing, which may result in a fact that the image created according to the conventional method is liable to have a problem in compatibility on the electronic products to be sold, and even causes a variety of problems such as black screen, frequency dispersion, sound and image delay in the images of the electronic products to be sold. Since the image creating method of the invention is not to create the image by pre-installing the operating system and then capturing a state of the electronic device after installing and setting other software by entering the operating system, a creating time is effectively reduced, and the problem in hardware compatibility caused by the aforementioned image is avoided.

Figure 4A:
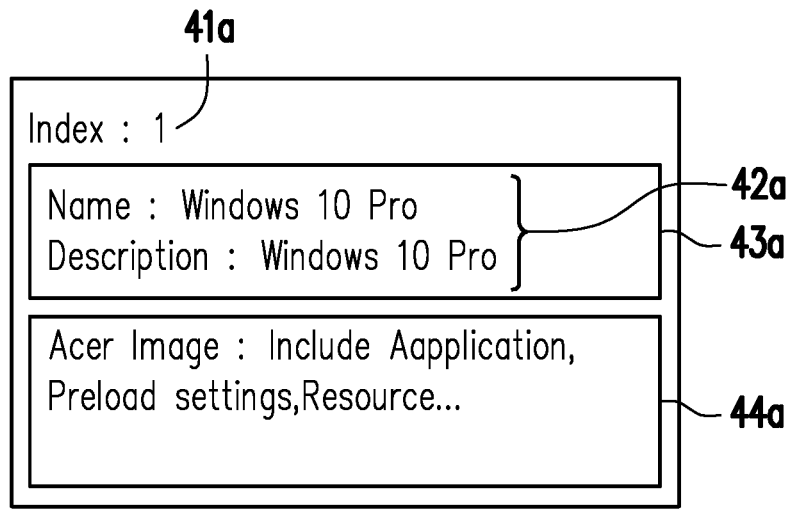
FIG. 4A-FIG. 4D are schematic diagrams of recover CDs (RCDs) according to an exemplary embodiment of the invention.
Figure 4B:
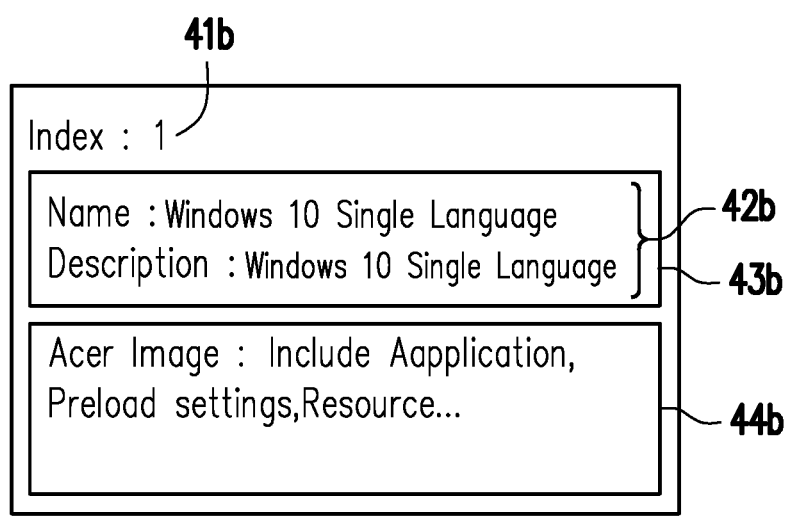
Figure 4C:
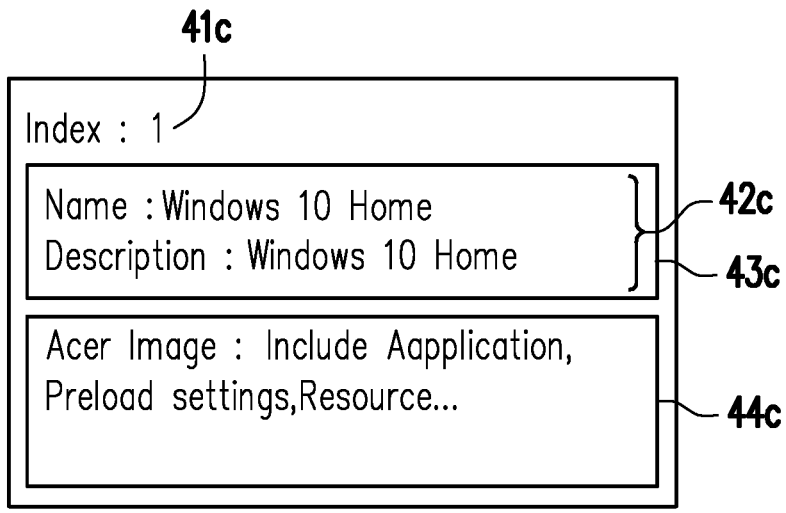
Figure 4D:
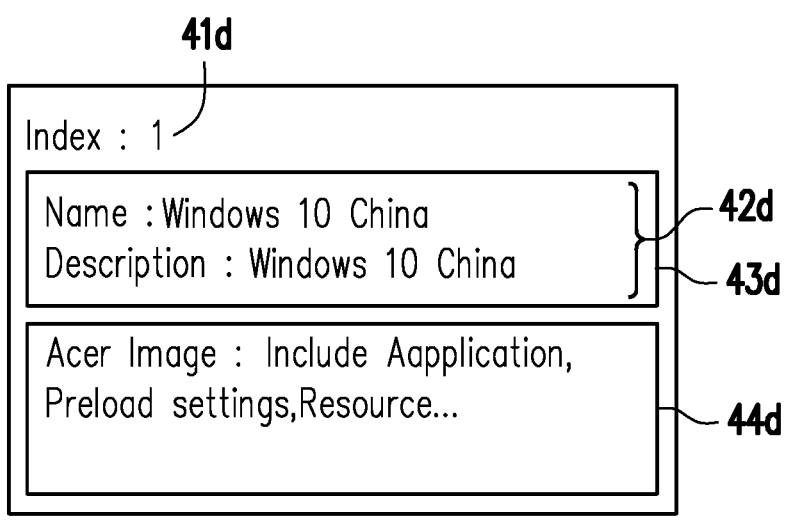

In detail, in step S203, the download module 24 further downloads a utility file and a bundle policy file (APBundle policy.xml), and the bundle policy file is, for example, an extensible markup language (XML), which is configured for recording a storage path and installation rules of each of the installation software. The utility file is configured for reading the bundle policy file to learn the storage path and the installation rules of each of the installation software when the image is installed at the ODM end. Moreover, the image creating module 26 further creates a temporary folder (for example, Temp_RCD), and mounts an index of an installation information file (install.win) corresponding to the operating system in the temporary folder, where the installation information file is configured for indicating operating system information contained in the image. Then, the image creating module 26 merges the aforementioned utility file, the bundle policy file, the operating system, the plurality of first drivers and the plurality of first software to the temporary folder, and compresses the content of the temporary folder into the first image after uninstalling the installation information file. FIG. 4A-FIG. 4D are schematic diagrams of RCDs according to an exemplary embodiment of the invention. Referring to FIG. 4A, the image (i.e. the RCD) commonly used by a plurality of electronic products records an installation information file index 41a and operating system information 42a provided by the installation information file, and the RCD includes an operating system 43a commonly used by the electronic products, for example, "Windows™ 10 Pro", and the first drivers and the first software 44a required to be installed in the electronic products. Referring to FIG. 4B, the image (i.e. the RCD) commonly used by the plurality of electronic products records an installation information file index 41b and operating system information 42b provided by the installation information file, and the RCD includes an operating system 43b commonly used by the electronic products, for example, "Windows™ 10 Single Language", and the first drivers and the first software 44b required to be installed in the electronic products. Referring to FIG. 4C, the image (i.e. the RCD) commonly used by the plurality of electronic products records an installation information file index 41c and operating system information 42c provided by the installation information file, and the RCD includes an operating system 43c commonly used by the electronic products, for example, "Windows™ 10 Home", and the first drivers and the first software 44c required to be installed in the electronic products. Referring to FIG. 4D, the image (i.e. the RCD) commonly used by the plurality of electronic products records an installation information file index 41d and operating system information 42d provided by the installation information file, and the RCD includes an operating system 43d commonly used by the electronic products, for example, "Windows™ 10 China", and the first drivers and the first software 44d required to be installed in the electronic products. Similarly, FIG. 4B-FIG. 4D respectively list the forms of the RCD having different operating systems and the common drivers and software. In conclusion, through the method for creating the cross-product line and cross-brand common image, the OEM end may reduce the creating time to enhance the reuse rate of the image, and avoid the problem of hardware compatibility of the image.

In an exemplary embodiment of the invention, it is assumed that the electronic products include at least one first electronic device and at least one second electronic device belonging to different product lines or brands, the at least one first electronic device and the at least one second electronic device may commonly use the first image, and the drivers or software required for the individual functions of the at least one first electronic device and the at least one second electronic device are also built in a corresponding image (i.e. a software CD) by the image creating device 100. Referring to FIG. 2, in step S205, the image creating device 100 creates software CDs (SCD) based on the differences between the plurality of electronic device for each of the electronic devices, for example, the image creating module 24 respectively creates a second image and a third image for the at least one first electronic device and the at least one second electronic device.

In detail, the input module 22 may load a software content list (which is also referred to as a second software content list) of the at least one first electronic device, the download module 24 may download at least one driver (which is also referred to as a second driver) and at least one software (which is also referred to as second software) according to the second software content list, and the image creating module 26 compresses the at least one second driver and the at least one second software into a second image. Similarly, the input module 22 may load a software content list (which is also referred to as a third software content list) of the at least one second electronic device, the download module 24 may download at least one driver (which is also referred to as a third driver) and at least one software (which is also referred to as third software) according to the third software content list, and the image creating module 26 compresses the at least one third driver and the at least one third software into a third image. In this example, the at least one second driver is different from the at least one third driver, or the at least one second software is different from the at least one third software. In other words, the second software content list and the third software content list respectively record a difference between the drivers or software required to be installed in the at least one first electronic device and the at least one second electronic device. Moreover, since each of the electronic devices probably has different usage description files, the usage description files are also contained in the respective SCD of each of the electronic devices.

On the other hand, in the exemplary embodiment of the invention, the ODM end may download the created RCD (for example, the first image) and the SCDs (for example, the second image and the third image) from the image creating device 100 by itself, and install the same to the plurality of electronic devices. For example, in step S207 of FIG. 2, the ODM end may decompress the RCD and the SCDs to execute the common RCD and the respective SCDs on each of the electronic devices, and install the operating system, at least one of the drivers and at least one of the software in the RCD, and install at least one driver and at least one software in the respective SCDs. For example, the ODM end decompresses the first image, and executes the first image on each of the electronic devices, and installs the operating system, at least one of the first drivers and at least one of the first software; and decompresses the second image and the third image to respectively execute the second image on the at least one first electronic device and install at least one second driver and at least one second software, and execute the third image on the at least one second electronic device and install at least one third driver and at least one third software.

To be specific, in step S207, in the operation of executing the common RCD on each of the electronic devices, a processor of each of the electronic devices calls the first drivers by using the utility file, and determines at least one of the first drivers complied with each of the electronic devices according to the bundle policy file (APBundle Policy.xml), and determines at least one of the first software installed in each of the electronic devices according to the bundle policy file. To be specific, since the bundle policy file may record a storage path and installation rules of each of the installation software, the processor of each of the electronic devices may read the bundle policy file through the utility file, and determine the software to be installed according to the installation rules of each of the installation software recorded by the bundle policy file, and obtain the software to be installed according to the storage path of each of the installation software. Similarly, the operation of executing the respective SCDs on each of the electronic devices is similar to the operation of executing the common RCD on each of the electronic devices, and detail thereof is not repeated. In conclusion, based on the method for creating the cross-product line and cross-brand common image of the exemplary embodiment of the invention, regarding the ODM end, since the ODM end is unnecessary to store the exclusive images of different product lines and different brands, a required storage space is effectively saved and storage cost is decreased. Moreover, since the cross-product line and cross-brand image provides commonality and simplifies the complexity of the image, management and use of the image at the ODM end are much easier, and the ODM end is unnecessary to download the respective exclusive images for different product lines or different brands, the efficiency for downloading and installing the image is improved.

Moreover, in the above step S203 and step S205, the input module 22 further creates a first identification number corresponding to the first software content list, and stores the first software content list having the first identification number to the database 28; and respectively creates a second identification number corresponding to the second software content list and a third identification number corresponding to the third software content list, and stores the second software content list having the second identification number and the third software content list having the third identification number to the database 28. Particularly, the first identification number, the second identification number and the third identification number are all different. In other words, the RCD and the SCD respectively have specific corresponding identification numbers, and the specific identification numbers are recorded in the database 28 of the image creating device 100, so as to facilitate the OEM end subsequently maintaining and managing all of the created images.

Based on the aforementioned method for creating image of the exemplary embodiment of the invention, the operating system and the installation software commonly required by the plurality of electronic device and the installation software respectively required by the plurality of electronic device may be separately created into the RCD and the SCD, so as to improve the efficiency for creating image, and the image created according to the above method is more flexible in subsequent application of a development process of the electronic products.

Figure 5:
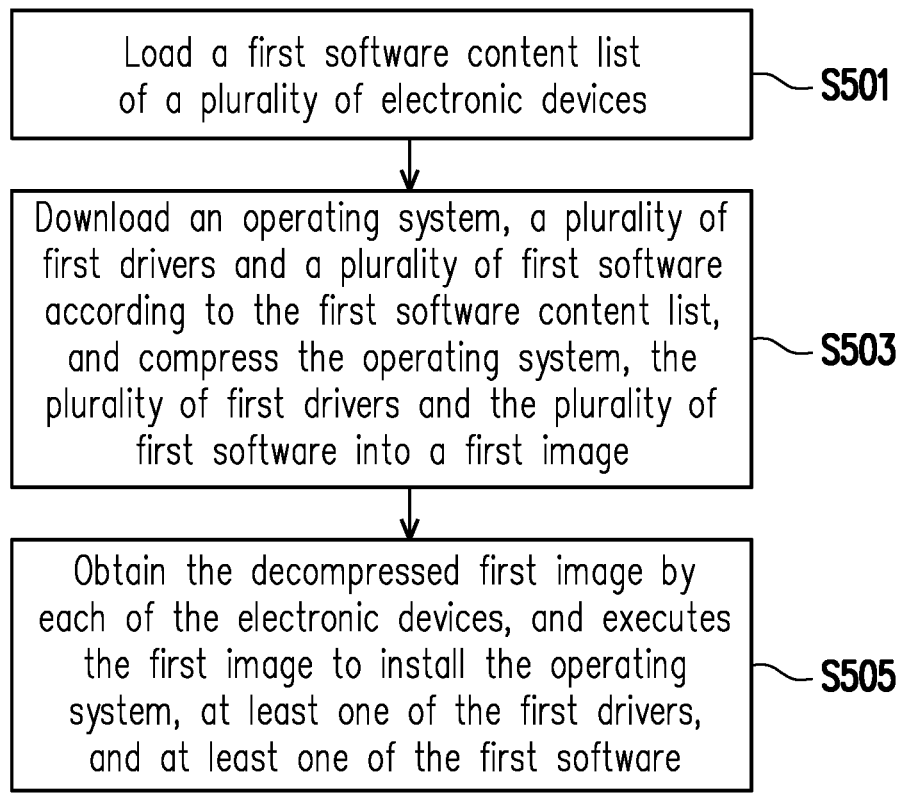
FIG. 5 is a flowchart illustrating a method for creating RCD according to an exemplary embodiment of the invention.

FIG. 5 is a flowchart illustrating a method for creating RCD according to an exemplary embodiment of the invention.

Referring to FIG. 5, in step S501, the input module 22 of the image creating device 100 loads a first software content list of a plurality of electronic devices.

In step S503, the download module 24 of the image creating device 100 downloads an operating system, a plurality of first drivers and a plurality of first software from a server according to the first software content list, and the image creating module 26 compresses the operating system, the plurality of first drivers and the plurality of first software into a first image.

Then, in step S505, each of the electronic devices obtains the decompressed first image, and executes the first image to install the operating system, at least one of the first drivers, and at least one of the first software.

However, various steps of FIG. 5 have been described above, and detail thereof is not repeated. It should be noted that the various steps of FIG. 5 may be implemented as a plurality of program codes or circuits, which is not limited by the invention. Moreover, the method of FIG. 5 may be used in collaboration with the aforementioned exemplary embodiments, or used independently, which is not limited by the invention.

In summary, the method and device for creating image of the exemplary embodiments of the invention effectively resolve the problem in hardware compatibility caused by creating the image by pre-installing the operating system and then capturing a state of the electronic device after installing and setting other software by entering the operating system, and by separately creating the operating system and installation software commonly required by the plurality of electronic devices and the installation software individually required by the electronic devices into the RCD and the SCD, efficiency for creating the image is effectively improved and a reuse rate of the image is enhanced. On the other hand, the method for creating image of the invention provides the cross-product line and cross-brand common image for a plurality of electronic devices and simplifies the complexity of the image, so that management and use of the image is much easier, and the storage space is effectively saved and storage cost is reduced.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A method for creating image, comprising:
loading, by a processor, a first software content list of a plurality of electronic devices;
downloading, by the processor, an operating system, a plurality of first drivers and a plurality of first software according to the first software content list, and compressing, by the processor, the operating system, the plurality of first drivers and the plurality of first software into a first image; and
decompressing the first image by each of the electronic devices, so as to execute and executing the first image on each of the plurality of electronic devices, and to install the operating system, at least one of the plurality of first drivers, and at least one of the plurality of first software by each of the electronic devices, wherein the method further comprises:

loading, by the processor, a second software content list of at least one first electronic device among the electronic devices, downloading at least one second driver and at least one second software according to the second software content list, and compressing, by the processor, the at least one second driver and the at least one second software into a second image; and loading, by the processor, a third software content list of at least one second electronic device among the electronic devices, downloading at least one third driver and at least one third software according to the third software content list, and compressing, by the processor, the at least one third driver and the at least one third software into a third image, wherein the at least one second driver is different from the at least one third driver, or the at least one second software is different from the at least one third software, wherein each of the first image, the second image and the third image is a file form of converting content of a storage medium into a disk image, wherein after the step of executing the first image on each of the plurality of electronic devices, and installing the operating system, at least one of the plurality of first drivers, and at least one of the plurality of first software, the method further comprises:

decompressing the second image to execute the second image on the at least one first electronic device, and installing the at least one second driver and the at least one second software; and decompressing the third image to execute the third image on the at least one second electronic device, and installing the at least one third driver and the at least one third software.

2. The method for creating image as claimed in claim 1, wherein the step of downloading the operating system, the plurality of first drivers and the plurality of first software according to the first software content list, and compressing the operating system, the plurality of first drivers and the plurality of first software into the first image comprises:

downloading a utility file and a bundle policy file;

creating a temporary folder, and mounting an index of an installation information file corresponding to the operating system in the temporary folder; and merging the utility file, the bundle policy file, the operating system, the plurality of first drivers and the plurality of first software into the temporary folder, and compressing content in the temporary folder into the first image after uninstalling the installation information file.

3. The method for creating image as claimed in claim 2, wherein the step of executing the first image on each of the plurality of electronic devices, and installing the operating system, at least one of the plurality of first drivers, and at least one of the plurality of first software comprises:

calling the plurality of first drivers by using the utility file, and determining at least one of the first drivers complied with each of the electronic devices according to the bundle policy file; and determining at least one of the plurality of first software installed in each of the electronic devices according to the bundle policy file.

4. The method for creating image as claimed in claim 1, wherein the step of loading the first software content list of the plurality of electronic devices comprises:

creating a first identification number corresponding to the first software content list, and storing the first software content list having the first identification number to a database, wherein the step of loading the second software content list of the at least one first electronic device among the electronic devices and loading the third software content list of the at least one second electronic device among the electronic devices comprises:

respectively creating a second identification number corresponding to the second software content list and a third identification number corresponding to the third software content list, and storing the second software content list having the second identification number and the third software content list having the third identification number to the database, wherein the first identification number, the second identification number and the third identification number are all different from each other.

5. An image creating device, comprising:

a storage device, storing a plurality of modules and a database; and a processor, coupled to the storage device, and loading and executing the modules stored in the storage device, the modules comprising:

an input module, loading a first software content list of a plurality of electronic devices;

a download module, downloading an operating system, a plurality of first drivers and a plurality of first software from a server according to the first software content list; and an image creating module, compressing the operating system, the plurality of first drivers and the plurality of first software into a first image, wherein each of the electronic devices obtains the decompressed first image, and executes the first image to install the operating system, at least one of the plurality of first drivers, and at least one of the plurality of first software, the input module further loads a second software content list of at least one first electronic device among the electronic devices, the download module further downloads at least one second driver and at least one second software according to the second software content list, and the image creating module further compresses the at least one second driver and the at least one second software into a second image, wherein the input module further loads a third software content list of at least one second electronic device among the electronic devices, the download module further downloads at least one third driver and at least one third software according to the third software content list, and the image creating module further compresses the at least one third driver and the at least one third software into a third image, wherein the at least one second driver is different from the at least one third driver, or the at least one second software is different from the at least one third software, wherein each of the first image, the second image and the third image is a file form of converting content of a storage medium into a disk image, wherein the at least one first electronic device among the electronic devices obtains the decompressed second image, and executes the second image to install the at least one second driver and the at least one second software, the at least one second electronic device among the electronic devices obtains the decompressed third image, and executes the third image to install the at least one third driver and the at least one third software.

6. The image creating device as claimed in claim 5, wherein the download module further downloads a utility file and a bundle policy file, wherein the image creating module creates a temporary folder, and mounts an index of an installation information file corresponding to the operating system in the temporary folder, wherein the image creating module further merges the utility file, the bundle policy file, the operating system, the plurality of first drivers and the plurality of first software into the temporary folder, and compresses content in the temporary folder into the first image after uninstalling the installation information file.

7. The image creating device as claimed in claim 6, wherein a processor of each of the electronic devices calls the plurality of first drivers by using the utility file, and determines at least one of the first drivers complied with each of the electronic devices according to the bundle policy file, wherein the processor of each of the electronic devices determines at least one of the plurality of first software installed in each of the electronic devices according to the bundle policy file.

8. The image creating device as claimed in claim 5, wherein the input module further creates a first identification number corresponding to the first software content list, and stores the first software content list having the first identification number to the database, wherein the input module further respectively creates a second identification number corresponding to the second software content list and a third identification number corresponding to the third software content list, and stores the second software content list having the second identification number and the third software content list having the third identification number to the database, wherein the first identification number, the second identification number and the third identification number are all different from each other.

\* \* \* \* \*